US009436198B2

(12) United States Patent
Fornage

(10) Patent No.: US 9,436,198 B2
(45) Date of Patent: Sep. 6, 2016

(54) METHOD AND APPARATUS FOR POWER CONVERSION

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 449 days.

(21) Appl. No.: 13/903,409

(22) Filed: May 28, 2013

(65) Prior Publication Data

US 2013/0250634 A1    Sep. 26, 2013

Related U.S. Application Data

(63) Continuation-in-part of application No. 12/807,715, filed on Sep. 13, 2010, now Pat. No. 8,717,780, which is a continuation of application No. 11/725,763, filed on Mar. 20, 2007, now Pat. No. 7,796,412.

(60) Provisional application No. 60/743,713, filed on Mar. 23, 2006.

(51) Int. Cl.
*H02M 3/335* (2006.01)
*G05F 1/625* (2006.01)
*H02M 3/28* (2006.01)
(Continued)

(52) U.S. Cl.
CPC .............. *G05F 1/625* (2013.01); *H02J 1/102* (2013.01); *H02J 3/383* (2013.01); *H02M 3/285* (2013.01); *H02M 3/33515* (2013.01); *H02M 7/48* (2013.01); *H02M 2001/007* (2013.01); *Y02E 10/563* (2013.01); *Y10S 323/906* (2013.01)

(58) Field of Classification Search
CPC .. H02M 3/285; H02M 3/33515; H02M 7/48; H02M 2001/007; H02J 1/102; H02J 3/383
USPC ....... 363/20, 21.01, 21.02, 21.03, 21.12, 65, 363/71
See application file for complete search history.

(56) References Cited

U.S. PATENT DOCUMENTS 4,404,472 A    9/1983   Steigerwald
4,626,983 A    12/1986  Harada et al.
(Continued)

FOREIGN PATENT DOCUMENTS

JP    59070147 A    4/1984
JP    09047021 A2   2/1997
(Continued)

OTHER PUBLICATIONS

Burra, R., et al., "A Low-Cost Fuel-Cell (FC) Power Electronic System (PES) for Residential Loads," 0-7803-8458-X/04, © 2004, *IEEE* pp. 468-473.
Basso, Christophe, "A 30 W Power Supply Operating in Quasi-Square Wave Resonant Mode", *On Semiconductor*, Publication Order No. AND8129/D, Oct. 2003—Rev. 0., 18 pgs.
(Continued)

*Primary Examiner* — Matthew Nguyen
(74) *Attorney, Agent, or Firm* — Moser Taboada

(57) ABSTRACT

A method and apparatus for converting a first power to a second power. In one embodiment the apparatus comprises a power conversion circuit for receiving the first power; and a controller, coupled to the power conversion circuit, for dynamically selecting between a non-interleaved mode and an interleaved mode for operating the power conversion circuit to convert the first power to the second power.

20 Claims, 9 Drawing Sheets

(51) Int. Cl.
*H02M 7/48* (2007.01)
*H02J 3/38* (2006.01)
*H02J 1/10* (2006.01)
*H02M 1/00* (2006.01)

(56) References Cited

U.S. PATENT DOCUMENTS

| | | | |
|---|---|---|---|
| 4,870,553 | A | 9/1989 | Brown |
| 5,268,832 | A | 12/1993 | Kandatsu |
| 5,430,635 | A | 7/1995 | Liu |
| 5,508,903 | A * | 4/1996 | Alexndrov .................. 363/16 |
| 5,594,635 | A | 1/1997 | Gegner |
| 5,768,118 | A | 6/1998 | Faulk et al. |
| 5,796,595 | A | 8/1998 | Cross |
| 5,818,703 | A | 10/1998 | Jacobson |
| 5,886,890 | A | 3/1999 | Ishida et al. |
| 5,898,585 | A | 4/1999 | Sirichote et al. |
| 6,031,736 | A | 2/2000 | Takehara et al. |
| 6,031,747 | A * | 2/2000 | Ilic et al. .................. 363/71 |
| 6,046,919 | A | 4/2000 | Madenokouji et al. |
| 6,147,886 | A * | 11/2000 | Wittenbreder .................. 363/95 |
| 6,201,180 | B1 | 3/2001 | Meyer et al. |
| 6,255,804 | B1 | 7/2001 | Herniter et al. |
| 6,301,129 | B1 | 10/2001 | Yasumura |
| 6,594,161 | B2 | 7/2003 | Jansen et al. |
| 6,678,176 | B2 | 1/2004 | Lumsden |
| 6,703,796 | B2 | 3/2004 | Che-Chen et al. |
| 6,809,942 | B2 | 10/2004 | Madenokouji et al. |
| 7,515,442 | B2 | 4/2009 | Mikulenka et al. |
| 7,675,759 | B2 | 3/2010 | Artusi et al. |
| 7,796,412 | B2 | 9/2010 | Fornage |
| 8,351,230 | B2 | 1/2013 | Nishihara et al. |
| 2003/0161167 | A1* | 8/2003 | Barnett et al. .................. 363/72 |
| 2004/0252530 | A1* | 12/2004 | Smidt ............... H02M 3/33584 363/21.12 |
| 2005/0036345 | A1 | 2/2005 | Lin et al. |
| 2005/0180173 | A1* | 8/2005 | Batarseh et al. ............... 363/15 |
| 2005/0270000 | A1 | 12/2005 | Chang et al. |
| 2006/0062034 | A1 | 3/2006 | Mazumder et al. |
| 2016/0079888 | A1* | 3/2016 | Li ................ H02P 6/002 318/400.3 |

FOREIGN PATENT DOCUMENTS

| | | | |
|---|---|---|---|
| JP | 09131067 | A2 | 5/1997 |
| JP | 2003235252 | A2 | 8/2003 |

OTHER PUBLICATIONS

"PID Controller," downloaded from eCircuit Center web site, http://www.ecircuitcenter.com/Circuits/pid1/pid1.htm, on Mar. 6, 2007, pp. 1-6.

Kern, G., "SunSine™ 300: Manufacture of an AC Photovoltaic Module," Final Report, Phases I & II, Jul. 25, 1995-Jun. 30, 1998, National Renewable Energy Laboratory (NREL), NREL/SR-520-26085, Mar. 1999, 32 pgs.

Saha, S., et al., "Novel grid-connected photovoltaic inverter," *IEEE Proc.-Gener. Transm. Distrib.*, vol. 143, No. 2, Mar. 1996, pp. 219-224.

UL-1741 ed. 1, "Standard for Inverters, Converters, Controllers and Interconnection System Equipment for Use with Distributed Energy Resources," May 1999, downloaded from http://ulstandardsinfonet.ul.com/scopes/1741.html on Jun. 6, 2007, 1 pg.

International Search Report and Written Opinion mailed Sep. 4, 2007 for PCT Application No. PCT/US2007/006841, 11 pgs.

International Preliminary Report on Patentability and Written Opinion mailed Oct. 2, 2008 for PCT Application No. PCT/US2007/006841, 7 pgs.

European Search Report dated Apr. 4, 2012 for European Patent Application No. 07251246.0-1242, 5 pgs.

S. Kim et al., "A Parallel-Connected Single Phase Power Factor Correction Approach with Improved Efficiency", Power Electronics and Power Quality Laboratory, Department of Electrical Engineering, Texas A&M University, IEEE, 2002, pp. 263-269.

Abstract attached to Master's Thesis of Chosun University entitled "A Study on the Maximum Power Point tracking Control for Photovoltaic System", dated Feb. 25, 2001, 47 pgs.

Abstract attached to a Doctoral Dissertation of Seoul National University entitled "Design and Analysis of Automotive High Intensity Discharge Lamp", dated Dec. 2000, 198 pgs.

Soeren Baekhoej Kjaer et al., "A Review of Single-Phase Grid-Connected Inverters for Photovoltaic Modules", IEEE, 2005, pp. 1-15.

Jin Sung Kim, "Improvement of the Response Characteristics of the Paralleled Converter Operating as the Redundancy Power Supply", Doctoral Dissertation, Department of Electrical Engineering, Graduate School, Chungnam National University, Feb. 2000, pp. 1-144 (English Abstract on pp. 119-121).

Kim Jeong-won, "Configuration and Control Method of Modular Converter Schemes for Distributed Power System", Doctoral Dissertation of Seoul National University, Dec. 2000, 213 pages (English Abstract on pp. 194-195).

* cited by examiner

METHOD AND APPARATUS FOR POWER CONVERSION

CROSS-REFERENCE TO RELATED APPLICATIONS

This application is a continuation-in-part of U.S. patent application Ser. No. 12/807,715, filed Sep. 13, 2010 and issued on May 6, 2014 as U.S. Pat. No. 8,717,780, which is a continuation of U.S. Pat. No. 7,796,412, issued Sep. 14, 2010, which claims benefit of U.S. provisional patent application Ser. No. 60/743,713, filed on Mar. 23, 2006. Each of the aforementioned patents is herein incorporated in its entirety by reference.

BACKGROUND OF THE INVENTION

1. Field of the invention

The present invention relates generally to power converters. More particularly, the present invention relates to a method and apparatus for performing power conversion through dynamic use of regular or quasi-resonant conversion circuitry.

2. Description of the Related Art

Power conversion circuits that convert direct current (DC) to alternating current (AC), or vice versa, are notoriously inefficient. Such circuits typically have efficiencies of 90% or less.

Therefore, there is a need in the art for a method and apparatus providing improved power conversion.

SUMMARY OF THE INVENTION

In one embodiment, the present invention discloses a method and apparatus for converting a first power to a second power. In one embodiment the apparatus comprises a power conversion circuit for receiving the first power; and a controller, coupled to the power conversion circuit, for dynamically selecting between a non-interleaved mode and an interleaved mode for operating the power conversion circuit to convert the first power to the second power.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
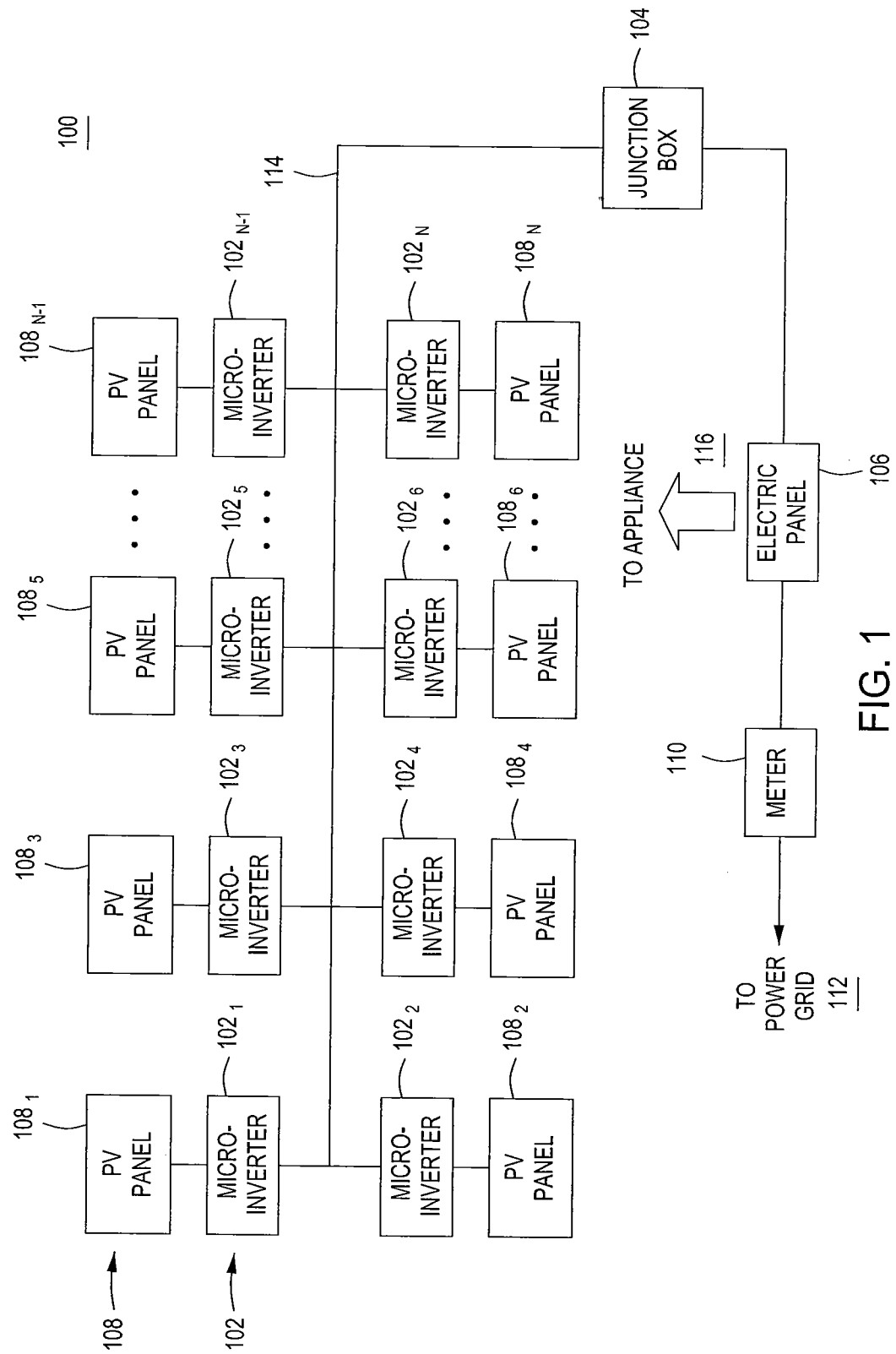
FIG. 1 is a block diagram of an exemplary power generation system that utilizes one embodiment of the present invention.

FIG. 1 is a block diagram of an exemplary power generation system 100 that utilizes one embodiment of the present invention. This diagram only portrays one variation of the myriad of possible system configurations. The present invention can function in a variety of environments and systems.

The power generation system 100 comprises a plurality of micro-inverters $102_1$, $102_2$ ... $102_n$, a junction box 104, an electric panel 106, a plurality of photovoltaic panels $108_1$, $108_2$ ... $108_n$, and an electric meter 110. The system 100 supplies power to a power grid 112, appliances 116, or both. The plurality of photovoltaic panels $108_1$, $108_2$ ... $108_n$ are well known in the art and are used for generating DC power from solar energy. The plurality of photovoltaic panels $108_1$, $108_2$ ... $108_n$ (also referred to herein as solar panels) may be of any size or shape. Even though the system 100 shows eight (8) photovoltaic panels $108_1$, $108_2$ ... $108_n$, the system 100 may include any number of the photovoltaic panels 108.

Each photovoltaic panel $108_1$, $108_2$ ... $108_n$ is coupled to a micro-inverter $102_1$, $102_2$ ... $102_n$. The micro-inverter $102_1$, $102_2$ ... $102_n$ converts DC power generated by the plurality of photovoltaic panels $108_1$, $108_2$ ... $108_n$ into AC power. The micro-inverters of the present invention meter out current that is in-phase with the AC grid current and generate such current with low distortion.

The micro-inverters $102_1$, $102_2$ ... $102_n$ couple the output AC to an AC bus 114. The AC bus 114 is terminated into a junction box 104. Using such an AC bus 114 and individual inverters, the system 100 is scalable and flexible to fit any user's needs. The structure and function of the micro-inverters $102_1$, $102_2$ ... $102_n$ are discussed below.

The junction box 104 generally connects together the outputs from all the micro-inverters $102_1$, $102_2$ ... $102_n$ to form a single AC feed to the electric panel 106.

The electric panel 106 connects the power from the junction box 104 to the power grid 112 and, in some applications, to appliances 116 within a user's facility. For example, in a home, the electric panel 106 is a well-known AC distribution hub comprising various circuit breakers and/or fuses to distribute electricity to various circuits within the home. The electric panel 106 is coupled through the electric meter 110 to the power grid 112. The meter 110 determines the amount of power supplied to the grid, such that the owner of the system 100 can be compensated for supplying electricity.

Figure 2:
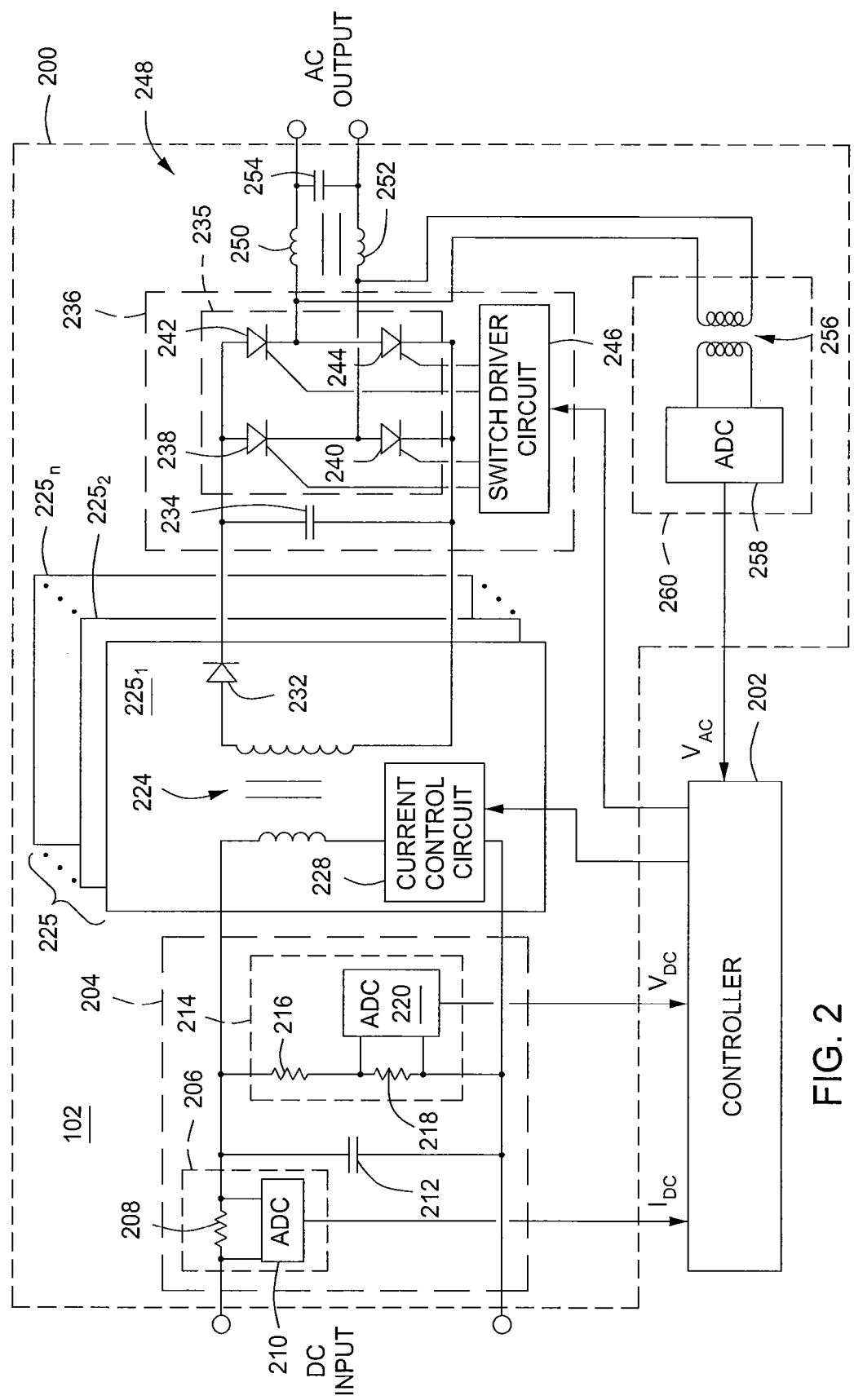
FIG. 2 is a detailed schematic diagram of an exemplary micro-inverter of FIG. 1.

FIG. 2 is a detailed schematic diagram of an exemplary embodiment of the micro-inverter of FIG. 1. The micro-inverter 102 comprises a power conversion circuit 200 and a controller 202. The power conversion circuit 200 comprises an input circuit 204 (also referred to as the DC circuit), at least one power stage $225_1$, $225_2$ ... $225_n$ (referred to as power stage(s) 225), an output circuit 236 (also referred to as the AC circuit), an output filter circuit 248, and an AC voltage sampler 260. The power stage 225 is coupled between the input circuit 204 and the output circuit 236.

The power conversion circuit 200 is controlled by controller 202 to efficiently convert the DC to AC. To optimize the efficiency, the controller 202 selects various flyback modes of operation for the power conversion circuit 200 depending upon the present state of the DC input voltage, required output current and AC output voltage. As such, in one embodiment, the power conversion circuit 200 switches amongst a regular flyback mode, an interleaved mode, a quasi-resonant mode, or combinations thereof, where regular flyback mode is used during a low voltage state, interleaved flyback mode is used during a high power state, and quasi-resonant flyback mode is used during a high voltage state. At a high power, high voltage state, an interleaved, quasi-resonant mode may also be used. These mode changes actively occur during each switching cycle of the power conversion circuit 200 to optimally convert DC power to AC power.

The input circuit 204 is coupled to one or more power stages 225 and will utilize one or more of the stages depending on whether the conversion circuit 200 is operating in an interleaved flyback mode. In certain embodiments, automatic balancing and timing synchronization may be employed when operating in an interleaved mode, for example as detailed in the commonly assigned, co-pending U.S. patent application Ser. No. 12/284,985, entitled "Method and Apparatus For Providing Power Conversion Using An Interleaved Flyback Converter With Automatic Balancing" and filed Sep. 26, 2008, which issued on Sep. 17, 2013 as U.S. Pat. Ser. No. 8,537,572 and is herein incorporated in its entirety by reference. In some embodiments of the invention, only one power stage is used and an interleaved flyback mode is unavailable. The input circuit 204 accepts DC input, for example, DC input generated by at least one photovoltaic panel. The input circuit 204 comprises a DC current sampler 206, an input capacitor 212, and a DC voltage sampler 214.

The ripple voltage across the input capacitor 212 has the form of a sine wave at double the line frequency and has a voltage excursion that equals the output voltage of the solar panel. By integrating the power (Vxl) generated by the panel across both halves of the cycle, the controller 202 can determine an optimal operating voltage for the panel, i.e., control the output current of the inverter to maintain an optimal load for the panel.

To facilitate using the panel power as a control metric, the input circuit 204 comprises a DC voltage sampler 214 and a DC current sampler 206. The DC current sampler 206 comprises a sampling resistor 208 and an ND Converter (ADC) 210, which may be coupled in parallel to the resistor 208. The ADC 210 generates digital samples that represent the DC current. The samples are coupled to the controller 202. One terminal of the sampling resistor 208 is coupled to the DC input and the other terminal is coupled to the input capacitor 212 and the DC voltage sampler 214. The terminal of the input capacitor 212 is coupled to the DC input.

The DC voltage sampler 214 comprises a voltage divider circuit comprising two (2) serially connected resistors 216 and 218 (forming a voltage divider) and an ADC 220. One terminal of the resistor 216 is coupled to the input capacitor 212 and the resistor 208. The second terminal of the resistor 216 is coupled to the resistor 218. The resistor 218 is coupled in parallel to the ADC 220. The second terminal of the resistor 218 is coupled to the input capacitor 212, which acts as an energy storage capacitor. The ADC 220 outputs DC voltage samples (i.e., Vdc) from the DC voltage sampler 214 to the controller 202.

The power stages $225_1, 225_2 \ldots 225_n$ are connected to one another in parallel. Each stage 225 comprises a transformer 224, a diode 232, and a current control circuit 228. Each power stage 225 performs a DC to DC conversion and generates a positive rectified sinewave. This rectified sinewave is unfurled by the output circuit 236 to form a true AC waveform. The primary winding (coil) of the transformer 224 is coupled to the input circuit 204 and the secondary winding (coil) of the transformer 224 is coupled through the diode 232 to the output circuit 236. The current control circuit 228 controls the DC voltage that is applied to the primary coil in accordance with signals generated by the controller 202. Each stage 225 is independently utilized such that the stages can be interleaved and share the current load for the micro-inverter 102. Selection of a stage is performed by activating the control circuit 228 of a selected stage. The transformer 224 creates a "stepped up" voltage that is proportional to the windings ratio $N_s/N_p$, where $N_p$ is the number of windings in the primary coil and $N_s$ is the number of windings in the secondary coil. In one embodiment, the voltage is increased four fold across the transformer 224. The secondary voltage is applied to the diode 232 to produce a rectified sine wave at the output of each power stage 225. The conversion process of all the stages 225 is controlled by the current control circuit 228 of each stage, which is described in detail with respect to FIG. 7 below.

The secondary coil of the transformer 224 couples in parallel to the output circuit 236. The output circuit 236 comprises a filter capacitor 234 and a switch circuit 235. The capacitor 234 removes certain spurious AC signals from the output signal. The energy at the output of the secondary winding may be pulsatile in nature. The capacitor 234 averages each cycle to form a smooth rectified sine wave. The switch circuit 235 selectively applies the rectified sine wave to either "line" or "neutral", the AC output terminals. The switching of the switch circuit 235 is controlled by the controller 202 to maintain phase synchronicity with the line voltage.

The switch circuit 235 comprises a plurality of electronic switches. In one embodiment, the circuit 235 comprises four (4) silicon-controlled rectifiers (SCR) 238, 240, 242 and 244 (e.g., thyristors or triacs). In other embodiments, the SCRs may be replaced with other electronic switches, such as, insulated gate bipolar transistor (IGBT), bipolar junction transistor (BJT), MOSFET, gate turnoff thyristor (GTO) and the like. The output from the SCRs 238, 240, 242 and 244 is controlled by the switch driver circuit 246. The cathode terminal SCR 238 is coupled to the anode of diode 232 and the filter capacitor 234. The anode terminal of the SCR 238 is coupled to the SCR 240. The control terminal of the SCR 238 is coupled to the switch driver circuit 246. The cathode terminal of the SCR 240 is coupled to the SCR 238 and the anode terminal of the SCR 240 is coupled to the filter capacitor 234 and the transformer 224. The control terminal of the SCR 240 is coupled to the switch driver circuit 246, which may perform galvanic insulation by using photocouplers, pulse transformers or the like to isolate the output circuit 236 from the controller 202. The cathode terminal of the SCR 242 is coupled to the SCR 238 and the anode terminal is coupled to the SCR 244. The cathode terminal of the SCR 244 is coupled to the SCR 242 and the anode terminal is coupled to the SCR 240. The control terminals of both the SCRs 242 and 244 are coupled to the switch driver circuit 246. The switching of the SCRs 238, 240, 242 and 244 is timed to ensure that the AC voltage is synchronously applied to the output terminals to match the phase of the grid voltage.

The output filter circuit 248 comprises two (2) inductors 250 and 252, and a capacitor 254. The first terminal of the inductor 250 is coupled between the SCR 242 and the SCR 244. The second terminal of the inductor 250 is coupled to the capacitor 254. The first terminal of the inductor 252 is coupled between the SCR 238 and the SCR 240. The second terminal of the inductor 252 is coupled to the capacitor 254. The output circuit 236 provides AC with a phase that is defined by the controller 202. The SCRs 238, 240, 242 and 244 are switched according to a switching signal generated by the controller 202. The AC output is formed across the capacitor 254. The filter 248 removes harmonic signals and various high frequency voltage spikes from the output voltage.

The AC voltage sampler 260 provides AC samples to the controller 202. The AC voltage sampler 260 comprises an isolation transformer 256 and an ADC 258 (or a limiter). The first terminal of the primary coil of the isolation transformer 256 is coupled to the first terminal of the inductor 250. The second terminal of the primary coil of the isolation transformer 256 is coupled to the first terminal of the inductor 252. Both terminals of the secondary coil of the isolation transformer 256 are coupled to the ADC 258. The ADC 258 outputs an AC voltage sample (i.e., Vac) to the controller 202.

The power conversion circuit 200 converts DC to AC in accordance with the control and switching signals produced by the controller 202. As shall be described below, the controller 202 produces the control and switching signals in response to the samples of the DC and AC signals. Consequently, the power conversion circuit 200 may be optimally controlled to utilize a particular mode of operation to correspond to the present state of the DC and AC signals, i.e., to optimally match the AC output to the phase of the power grid such that the AC power is efficiently coupled to the power grid.

The controller 202 causes the power conversion circuit 200 to switch amongst various modes: simple flyback, quasi-resonant flyback, interleaved flyback and combinations thereof. The tasks of the controller 202 are to (1) control the power conversion circuit to have effective Maximum Power Point Tracking (MPPT), which alternatively may be performed by another circuit; (2) estimate the phase, voltage and frequency of the AC voltage; (3) accommodate unexpected behaviors such as over-current in the power stage; and (4) report to the end user data such as statistics on AC power generated by the micro-inverter.

Figure 3:
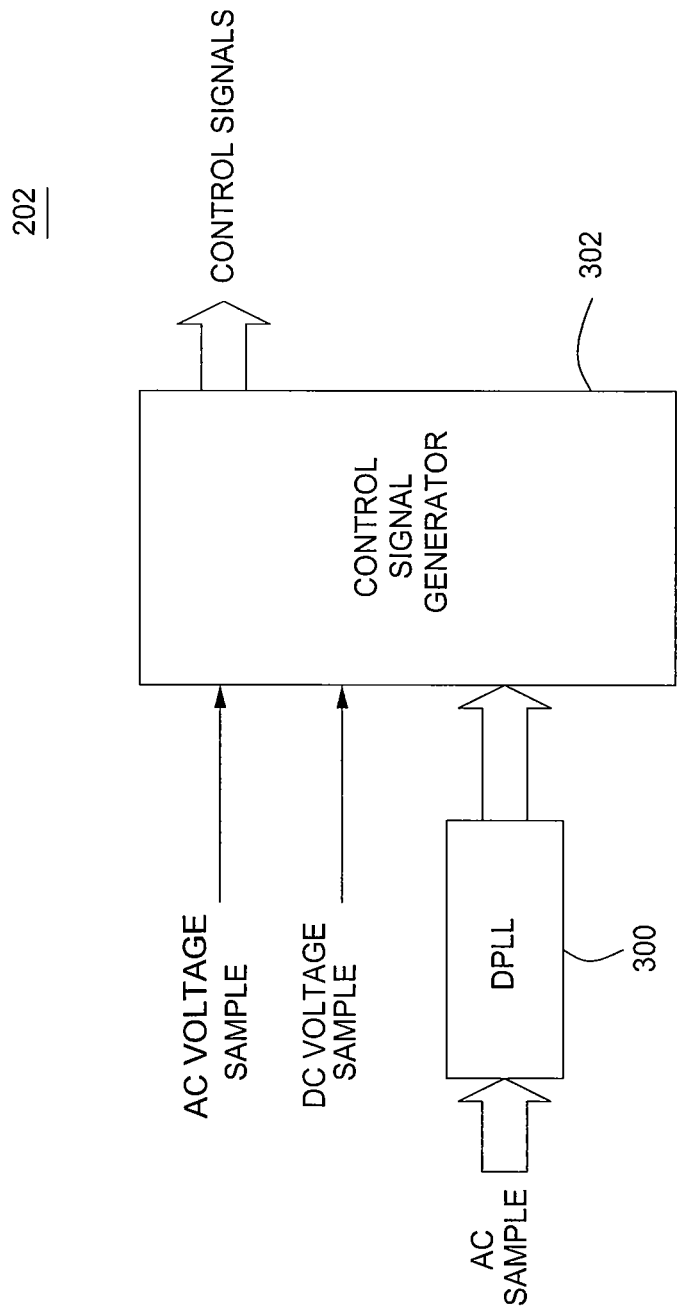
FIG. 3 is a block diagram of an exemplary embodiment of the controller of FIG. 2.

FIG. 3 is a high level block diagram of the controller 202 comprising a digital phase lock loop (DPLL) 300 and a control signal generator 302. The DPLL 300 phase locks an oscillator to the AC voltage samples to produce a digital signal (e.g., an 8-bit signal) that is representative of the phase of the input signal. The phase signal is coupled to the control signal generator 302. The generator 302 uses the AC voltage, DC voltage and phase information to produce control signals for the current control circuit 228 and the switch circuit 235 of FIG. 2.

Figure 4:
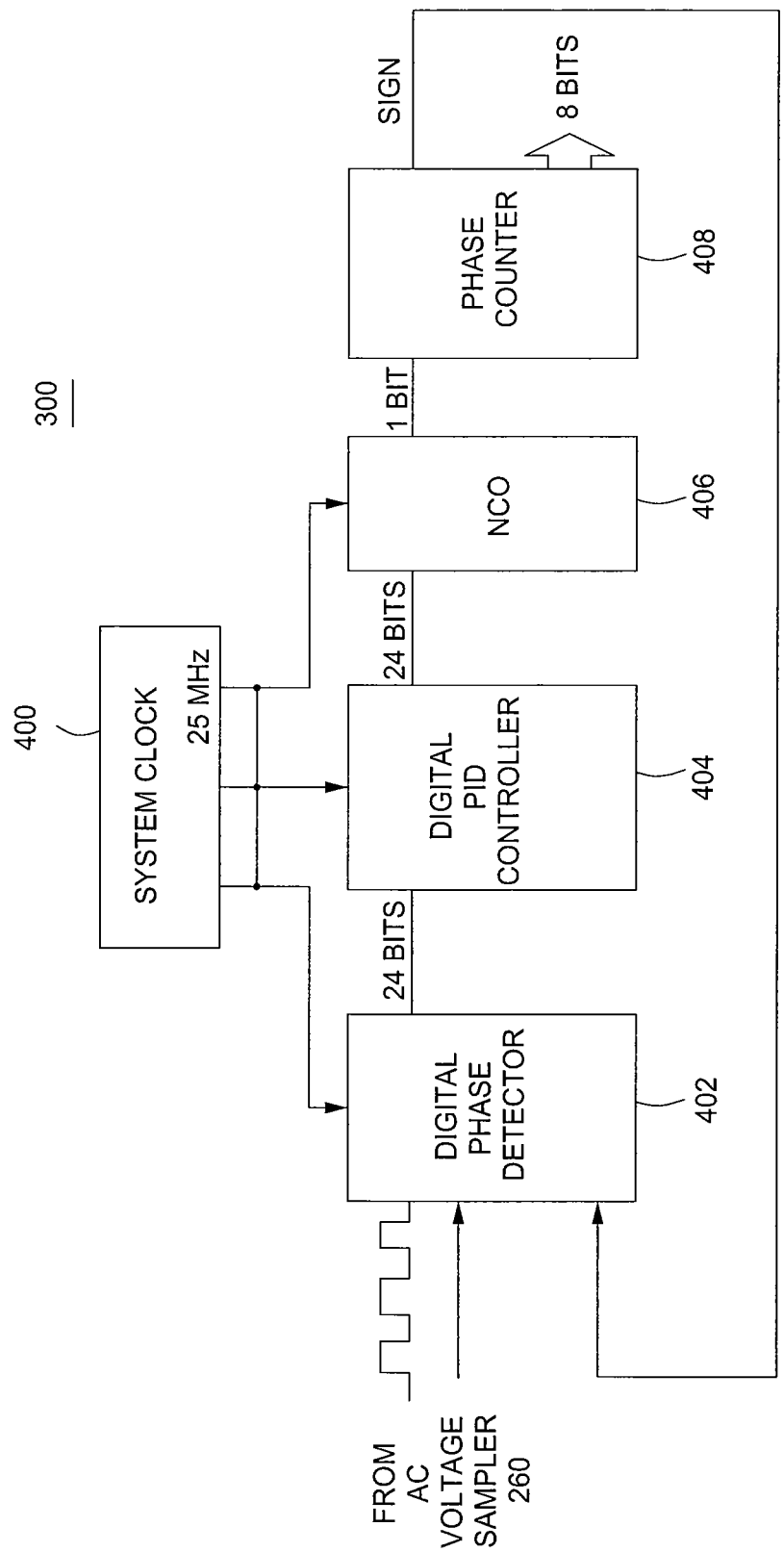
FIG. 4 is a block diagram of an exemplary embodiment of the digital phase lock loop of FIG. 3.

FIG. 4 is a detailed block diagram of an exemplary embodiment of the DPLL 300 FIG. 3. The DPLL 300 comprises a digital phase detector 402, a digital PID (Proportional, Integral Derivative) controller 404, a numerically controlled oscillator (NCO) 416, a phase counter 408 and a system clock 400.

The DPLL 300 operates in a conventional manner where the output of the NCO 406 is phase locked to the AC voltage samples from the AC voltage sampler 260. In this embodiment, the loop filter for the DPLL 300 is the PID controller 404. Other forms of loop filter implementations are available and can be used in the DPLL 300. In operation, the sign bit from the phase counter 408 is compared to the sampled AC voltage using the phase detector 402 to produce a phase error, e.g., a 24-bit signal. The phase error is filtered by the PID controller 404 and applied to the NCO 406. The NCO 406 generates a signal in accordance with the clock (e.g., 25 MHz) and the phase difference. The NCO output is coupled to the phase counter to produce a phase signal (e.g., an 8-bit signal) representing the AC voltage phase locked to the system clock signal.

Figure 5:
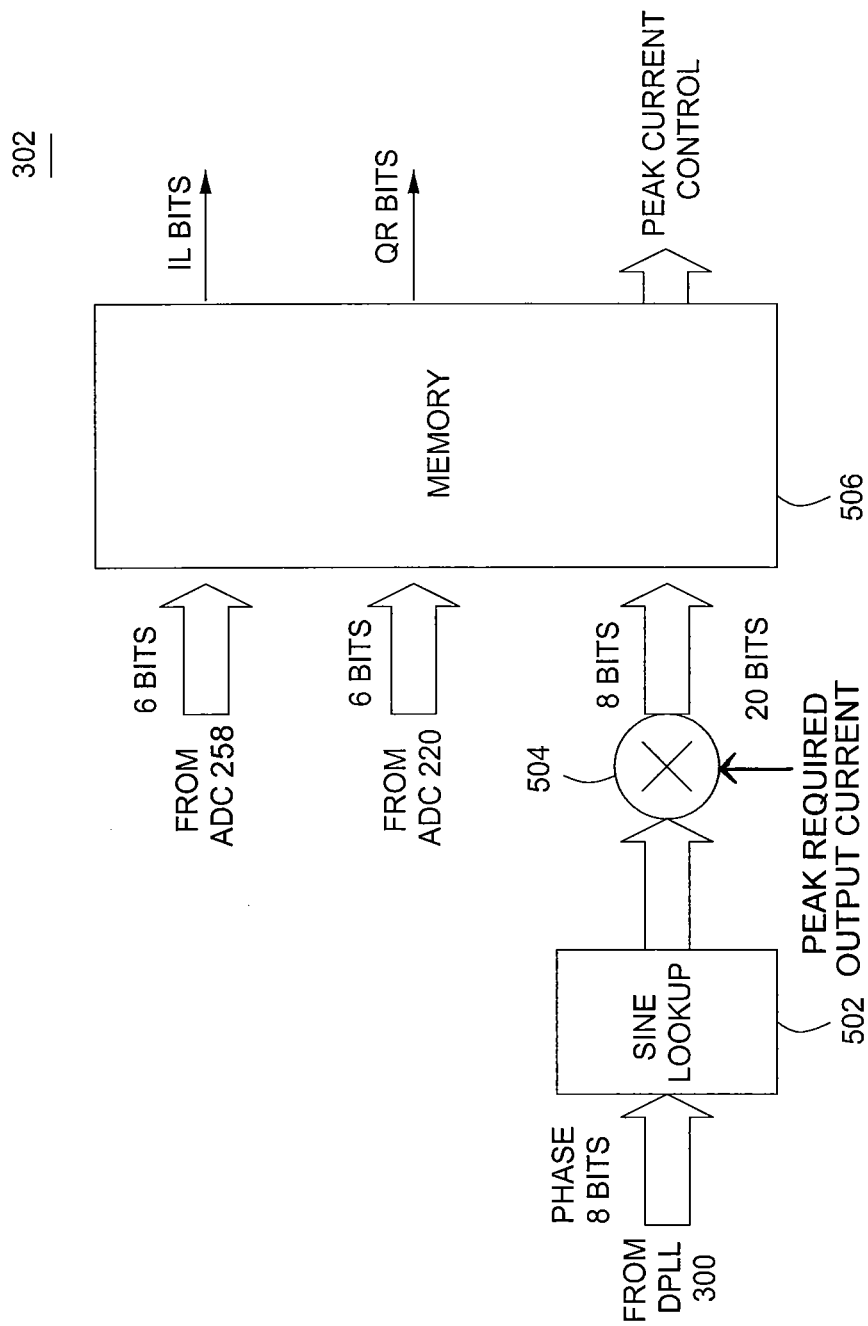
FIG. 5 is a detailed block diagram of an exemplary embodiment of the control signal generator.

FIG. 5 is a detailed block diagram of an exemplary embodiment of the control signal generator 302 (see FIG. 3). The control signal generator 302 comprises a sine lookup table 502, a multiplier 504 and a memory 506. The sine lookup table 502 receives the phase signal produced by the DPLL 300 and generates a sinusoidal signal in accordance with the phase signal. In essence, this table 502 creates a waveform that is phase locked to the power grid voltage. Thus, the sine lookup table assists in generating a low distortion current on the grid, regardless of the actual voltage waveform. The multiplier 504 multiplies the waveform with the peak required output current as determined by MPPT. The result is a scaled digital signal representing a required output current Ireq (i.e., the instantaneous Ireq based on the phase information, the sine lookup, and the peak required current amplitude). This signal is coupled to the memory 506 as an address.

The memory 506 is any type of computer readable memory. The memory 506 may comprise random access memory or read only memory. The memory 506 receives the signals generated by the ADC 258 and ADC 220 (e.g., 6-bit signals) in addition to the 8-bit sinusoidal signal. As such, a 20-bit word is used to address the memory. The memory 506 receives the address inputs and outputs an inverter mode and phase signal settings, such as, Interleaved (IL) bit, a quasi-resonant (QR) bit, and peak current control bits. These signals are used to control the power conversion circuit 200.

In the depicted embodiment of the control signal generator, the memory 506 is used as a lookup table that is sequenced by the 20 bit address. As such, the present values of required current, DC voltage and AC voltage are used to select the control signals to facilitate operation of the inverter in a particular mode. The memory 506 is preloaded with a table that represents the control signals to be generated for various combinations of required current, DC voltage, and AC voltage. Although a memory is used in this embodiment, those skilled in the art will realize that a microprocessor or microcontroller may also be used to generate the control signals in view of the required current, DC voltage and AC voltage.

Figure 6:
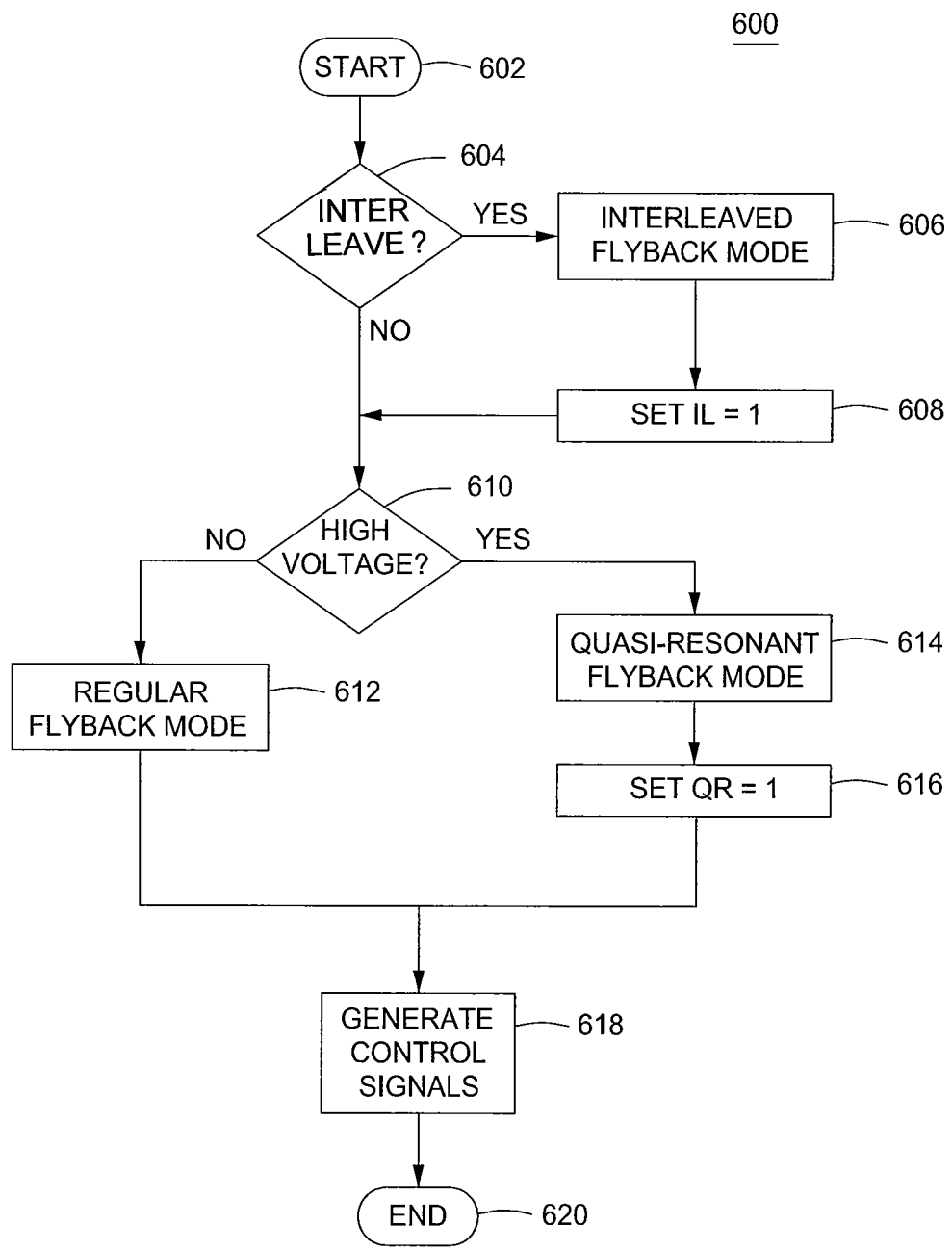
FIG. 6 is a flow diagram depicting an exemplary embodiment of a method 600 of operation of a micro-inverter of the present invention.

FIG. 6 is a flow diagram depicting an exemplary embodiment of a method 600 of operation of a micro-inverter of the present invention. This method 600 may be performed at each sequence step, e.g., for each clock transition, at each new ADC sample, at each power conversion cycle (e.g., every few microseconds), or at each lookup of memory 506 (e.g., 512 times per grid cycle). As such, during a given AC cycle the inverter may utilize different modes of operation during the cycle.

The method 600 starts at step 602 and proceeds to step 604. At step 604, the method 600 determines whether conditions are sufficient for interleaved flyback mode operation. In some embodiments, the method 600 performs calculations and checks if the power is greater than a power threshold. To compute the power, the AC voltage sample is multiplied by the required current. If the operating power is greater than the power threshold, the method 600 proceeds to step 606, wherein the mode is an interleaved flyback mode. The interleaved flyback mode selects additional power stages to be used to share the power conversion requirements of the system. The threshold is set to ensure that additional stages are used if the power level exceeds the safe level of a single power stage. Additional stages can be used in proportion to the amount of power. If additional stages are necessary, at step 608, the interleaved mode bit is set (IL=1). In certain embodiments, a combination of the computed power (Vac×Ireq), Vdc and Vac may be used at step 604 to determine whether to operate in interleaved mode. In other embodiments, the micro-inverter may not utilize an interleaved flyback mode, i.e., only one power stage is present. In such embodiments, steps 604, 606 and 608 are not used.

In the embodiment which uses a memory as a lookup table, the values of required current Ireq and output voltage Vac representing a "high" power level are used to address a table entry that outputs IL=1, otherwise IL=0 for "low" power levels; in some embodiments, the values Vdc and Vac as well as power based on Ireq and Vac are used to determine the setting for the IL bit. An embodiment using a microprocessor would implement the flow diagram as a functional if, then, else statement.

At step 610, the method 600 queries whether the voltage is sufficient to warrant using a quasi-resonant flyback mode for the power conversion circuit 200; in some embodiments, quasi-resonant flyback mode is used for a high voltage state as determined by Vac/Vdc. If the query is negatively answered, the method 600 switches to, or remains in, a regular flyback mode. If, however, the voltage is sufficient to have an affirmative answer to the query of step 610, the method 600 proceeds to step 614 where a quasi-resonant flyback mode is selected. Note that a combination mode of either interleaved, quasi-resonant flyback mode or interleaved, regular flyback mode is also selectable. At step 616, a quasi-resonant bit (QR=1) is set. At step 618, the current signal and the mode selection bits are created. The method ends at step 620.

Figure 7:
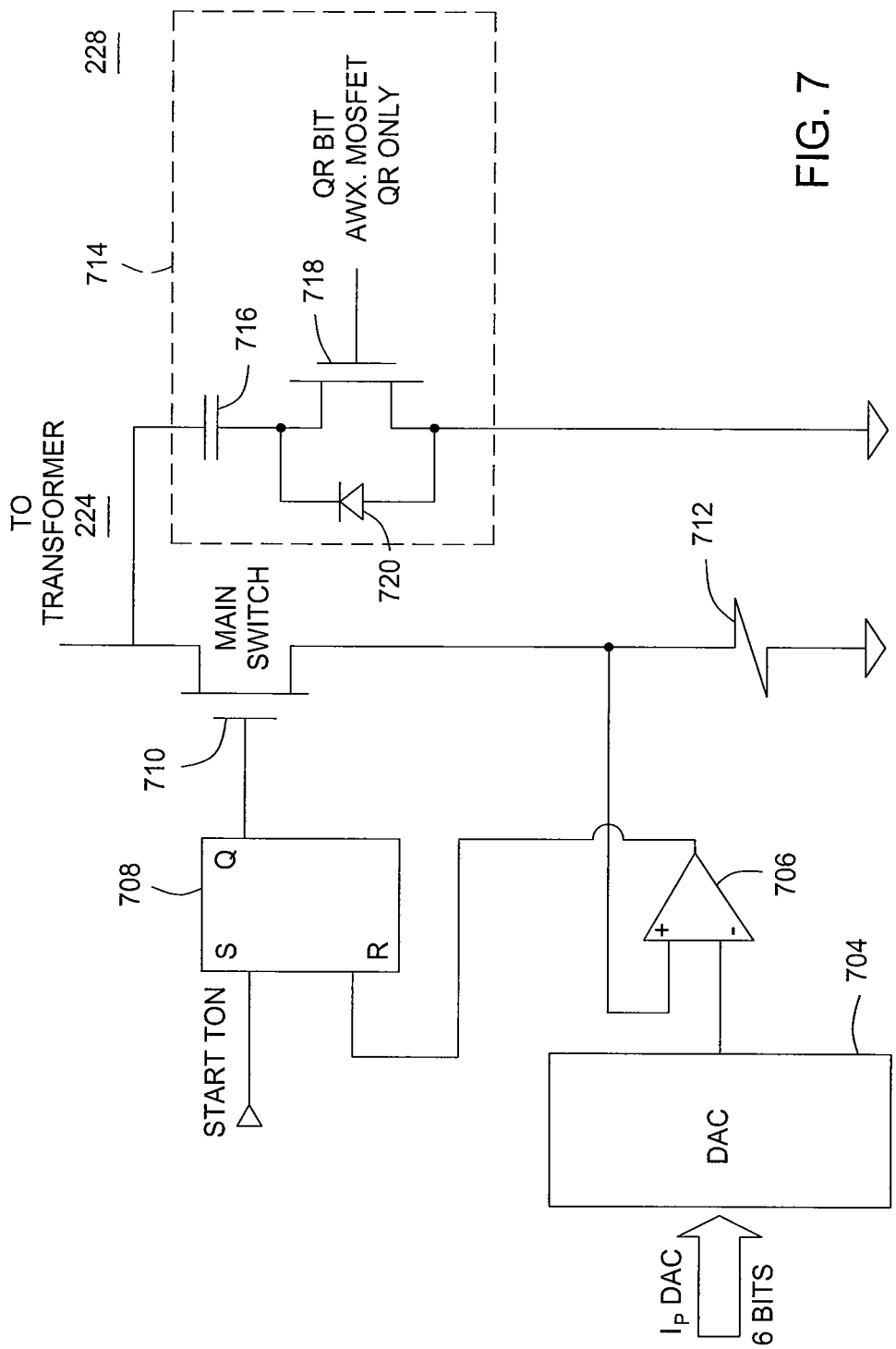
FIG. 7 is a detailed schematic diagram of an exemplary embodiment of the current control circuit.

FIG. 7 is a detailed schematic diagram of an exemplary embodiment of the current control circuit 228 (FIG. 2). The circuit 228 comprises a digital-to-analog converter (DAC) 704, a comparator 706, a flip-flop 708, a switch 710, a resistor 712, and an auxiliary quasi-resonant (QR) mode circuit 714. The peak current control signal generated by the memory 506 is coupled to the DAC 704. The DAC 704 converts the digital signal into an analog signal that is coupled to the negative input of the comparator 706. One terminal of the bias resistor 712 couples with the positive input of the comparator 706 and the drain of the switch 710. The switch 710 may be a MOSFET, BJT, IGBT or any other form of switch known in the art. The other terminal of the resistor 712 is grounded. As such, the comparator 706 operates as a switch depending on the level of the current control signal relative to the signal at the bias resistor 712. The relative state of the two signals resets the SR flip-flop 708. In some other embodiments, the resistor 712 may be replaced by other well-known means for sensing current, such as a current sense transformer, a diode, a burden resistor, and the like.

The flip-flip 708 has two (2) inputs, "R" and "S", and one (1) output, "Q". The output of the op-amp 706 couples to the "R" input of the flip-flop 708. The Start Ton signal, which may also be the power transfer cycle start, is coupled to the "S" input of the flip-flop 708. The "Q" output drives the gate of the switch 710.

The auxiliary QR circuit 714 is triggered by the switch 718 when the mode is a quasi-resonant. The auxiliary QR circuit 714 comprises a capacitor 716, a diode 720, and an auxiliary power switch 718 (MOSFET). The circuit 714 switches a capacitor 716 across the main switch 710 to facilitate quasi-resonant operation of the circuit. The first terminal of the capacitor 716 couples to the source terminal of the main switch 710. The second terminal of the capacitor 716 couples to the source terminal of the switch 718. The drain terminal of the switch 718 is coupled to ground. The diode 720 is connected across the drain and source terminals. The gate of the switch 718 is controlled by the QR bit from memory 506.

When operating in a flyback mode, at the beginning of a cycle, the current in the primary coil is zero (0) and the main switch 710 is then turned on. The current in the primary coil increases linearly until a predetermined value Ipp is reached, upon which the switch 710 is opened. The energy stored in the primary coil is then transferred to the secondary coil, in which the current instantaneously raises to Ipp/n, where n is the secondary primary turn ratio for the transformer. The voltage on the primary switch increases to Vin+Vout/n. The current in the secondary drops linearly to zero with a slope of Vout/Ls, when the output diode (232 in FIG. 2) turns off and the cycle can be started again. A cycle duration is from 2 to 50 µs in most applications.

When operating a quasi-resonant flyback mode, the inverter utilizes the parasitic capacitance of the main switch 710 or, in the depicted embodiment, an added capacitance (e.g., capacitor 716) to absorb the leakage inductance energy. Thus, the QR bit is set to turn on the switch 718 and place the additional capacitor across the main switch 710. Also, by adequately choosing the turn-on time of the switch 710, it is possible to have a zero voltage turn-on characteristic as well as turn-off. This is performed to the benefit of the overall efficiency. One of the issues with this approach is that true zero voltage cannot be achieved for all operating conditions. For instance, the secondary reflected voltage (Vout/n) must be higher than the input voltage to have a zero voltage turn-on.

In an interleaved mode, two or more individual power stages (either operating in flyback or quasi-resonant flyback) can be combined to operate at the same frequency at each cycle while phase interleaved. In this manner, very high current can be handled by the inverter. The main power stage is used most of the time, while an auxiliary power stage may be used when required, i.e., when the IL bit is set. The auxiliary power stage is operated with a delay. If two power stages are used, then the delay is ½ of an AC cycle (i.e., ½ of a power conversion cycle), if 3 power stages are used, then the delay is ⅓ of an AC cycle (i.e., ⅓ of a power conversion cycle) and so one for N stages. Such an inverter may have many advantages, including reduction in the size of the parts used in the power path; a current rating in each power stage halved compared to a single power stage approach; and a reduction in EMI/RFI generation.

The foregoing approach is used to dynamically change the topology of the inverter from regular flyback to interleaved flyback to interleaved quasi-resonant based on the input voltage, the required output current and the output voltage. At lower voltage and current outputs, the current in the primary is such that a little amount of energy is lost in the leakage inductance at turn-off and discharge of the parasitic capacitance at turn-on. At high power, it is possible to interleave two power stages in order to reduce "root mean square" currents in the input and output filters, and therefore the output noise. When the voltage is sufficiently large, the system is switched into quasi-resonant mode in order to improve the overall efficiency.

Figure 8:
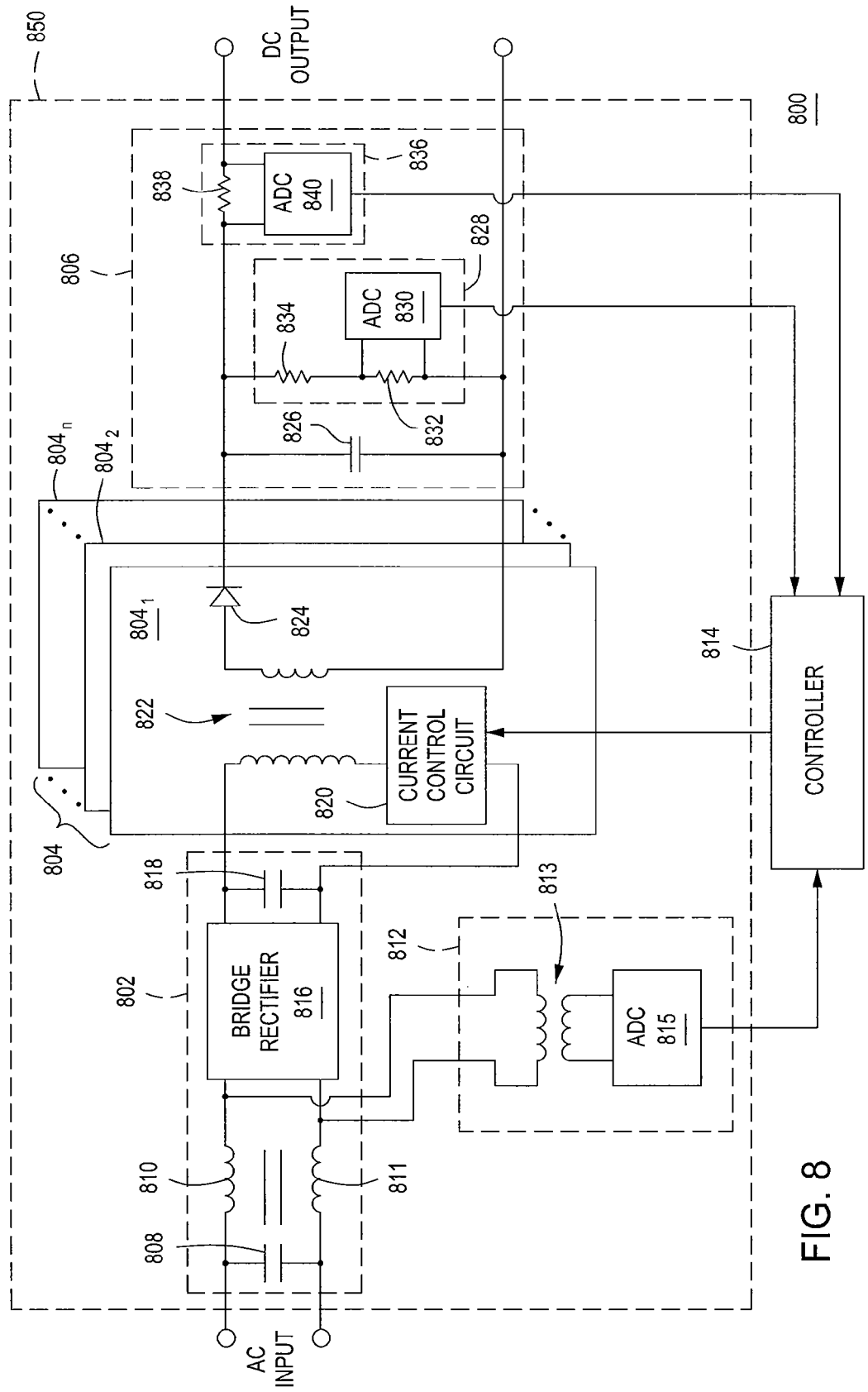
FIG. 8 is a detailed schematic diagram of an alternative embodiment of the invention for providing AC to DC conversion.

FIG. 8 is a detailed schematic diagram of an alternative embodiment of the invention for providing AC to DC conversion. Such AC to DC conversion may be utilized, for example, in power factor correction supplies for providing constant current with a unity power factor. An AC-DC inverter 800 comprises a power conversion circuit 850 coupled to a controller 814. The power conversion circuit 850 comprises an input circuit 802, at least one power stage 804₁, 804₂ ... 804ₙ (collectively referred to as power stages 804), an output circuit 806, and an AC voltage sampler 812. The power stages 804 are coupled between the input circuit 802 and the output circuit 806.

The input circuit 802 comprises a capacitor 808 coupled across a source of AC input power, and two inductors 810 and 811, a bridge rectifier 816, and a capacitor 818. The AC power source may be any suitable source of AC input power, such as AC power from a commercial AC power grid. The inductor 810 is coupled between a first terminal of the capacitor 808 and a first input terminal of the bridge rectifier 816, and the inductor 811 is coupled between a second terminal of the capacitor 808 and a second input terminal of the bridge rectifier 816. The capacitor 808 and the inductors 810 and 811 act as an AC filter to remove harmonic signals and various high frequency voltage spikes from the AC input voltage to the bridge rectifier 816.

The bridge rectifier 816 may be any bridge rectifier that provides full-wave rectification as known in the art. Two output terminals of the bridge rectifier 816 are coupled across the capacitor 818 for applying the rectified output from the bridge rectifier 816 to the capacitor 818.

The AC voltage sampler 812 samples the AC voltage across the input of the bridge rectifier 816 and provides signals indicative of the sampled voltage (i.e., AC voltage samples) to the controller 814. The AC voltage sampler 812 comprises an isolation transformer 813 and an ADC 815 (or, alternatively, a limiter). The isolation transformer's primary winding is coupled across the bridge rectifier 816, and the isolation transformer's secondary winding is coupled across the ADC 815. The ADC 815 couples the obtained AC voltage samples to the controller 814.

In embodiments with more than one power stage 804, the power stages 804 are coupled to one another in parallel and are further coupled across the input circuit 802; the input circuit 802 will utilize one or more of the power stages 804 depending on whether the power conversion circuit 850 is operating in an interleaved flyback mode. In some embodiments, automatic balancing and timing synchronization may be employed when operating in an interleaved mode, for example as detailed in the aforementioned U.S. Pat. No. 8,537,572. Each power stage 804 comprises a transformer 822 (i.e., the power stages 804 are isolated), a diode 824, and a current control circuit 820. A series combination of the transformer's primary winding and the current control circuit 820 is coupled across the capacitor 818 of the input circuit 802. A series combination of the transformer's secondary winding and the diode 824 is coupled across the output circuit 806 such that an anode terminal of the diode 824 is coupled to the secondary winding and a cathode terminal of the diode 824 is coupled to the output circuit 806.

The current control circuit 820 is coupled to the controller 814 and controls the DC voltage that is applied to the primary winding in accordance with signals generated by the controller 814. Each power stage 804 is independently utilized (i.e., selected) such that the power stages 804 can be interleaved and share the current load for the AC-DC inverter 800; based upon current and/or voltage parameters, one or more power stages 804 may be selected for optimally converting the AC power to DC power. Selection of a power stage 804 is performed by activating the control circuit 820 of a particular power stage 804; power is then supplied to the corresponding transformer 822 based on the operation of the current control circuit 820. The transformer 822 creates a "stepped down" voltage that is proportional to the windings ratio $N_s/N_p$, where $N_p$ is the number of windings in the primary winding and $N_s$ is the number of windings in the secondary winding; in some alternative embodiments, the transformer 822 may create a "stepped up" voltage. The secondary voltage is applied to the diode 824 to produce a rectified sine wave at the output of the power stage. Each selected power stage 804 performs a DC to DC power conversion to generate a positive rectified sinewave output where the conversion process of each selected stage 804 is controlled by the corresponding current control circuit 820.

The rectified sinewave output from each active (i.e., selected) power stage 804 is coupled to the output circuit 806. The output circuit 806 comprises a smoothing capacitor 826, a DC voltage sampler 828, and a DC current sampler 836. The smoothing capacitor 826 is coupled across the DC voltage sampler 828 and smooths the rectified sinewave received from each active power stage 804 to provide a DC output. The DC voltage sampler 828 samples the DC output voltage and comprises an ADC 830 as well as serially coupled resistors 834 and 832 that form a voltage divider circuit. A first terminal of the resistor 834 is coupled to the filter capacitor 826, and a second terminal of the resistor 834 is coupled to a first terminal of the resister 832. A second terminal of the resistor 832 is coupled to a second terminal of the filter capacitor 826, and the ADC 830 is coupled across the resister 832. The ADC 830 is coupled to the controller 814 and provides signals indicative of the sampled DC output voltage (i.e., DC voltage samples) to the controller 814.

The DC current sampler 836 samples the DC output current and comprises a sampling resistor 838 and an ADC 840. The sampling resistor 838 is coupled between the first terminal of the resistor 834 and a first DC output terminal of the power converter 850, and the ADC 840 is coupled across the sampling resistor 838. The ADC 840 generates signals that represent the DC output current (i.e., DC current samples) and couples such samples to the controller 814.

The power conversion circuit 850 is controlled by controller 814 to efficiently convert the received AC power to DC power. To optimize efficiency of the AC-DC power conversion, the controller 814 selects various modes of operation for the power conversion circuit 850 depending upon the present state of the current and voltage. As such, in one embodiment, the power conversion circuit 850 switches amongst a regular flyback mode, an interleaved mode, a quasi-resonant mode, or combinations thereof, where regular flyback mode is used during a low voltage state, interleaved flyback mode is used during a high power state, and quasi-resonant flyback mode is used during a high voltage state. At a high power, high voltage state, an interleaved, quasi-resonant mode may also be used. These mode changes actively occur during each switching cycle of the power conversion circuit 850 to optimally convert the received AC power to DC power. The controller 814 thus produces the control and switching signals for driving the power conversion circuit 850 in response to the present DC and AC signals; consequently, the power conversion circuit 850 may be optimally controlled to utilize a particular mode of operation to correspond to the present state of the DC and AC signals.

In some embodiments, the current control circuit 820 may be the current control circuit 228 of FIG. 7. In such embodiments, the switch 718 switches the capacitor 716 across the main switch 710 as previously described for operating a power stage 804 in a quasi-resonant mode.

Figure 9:
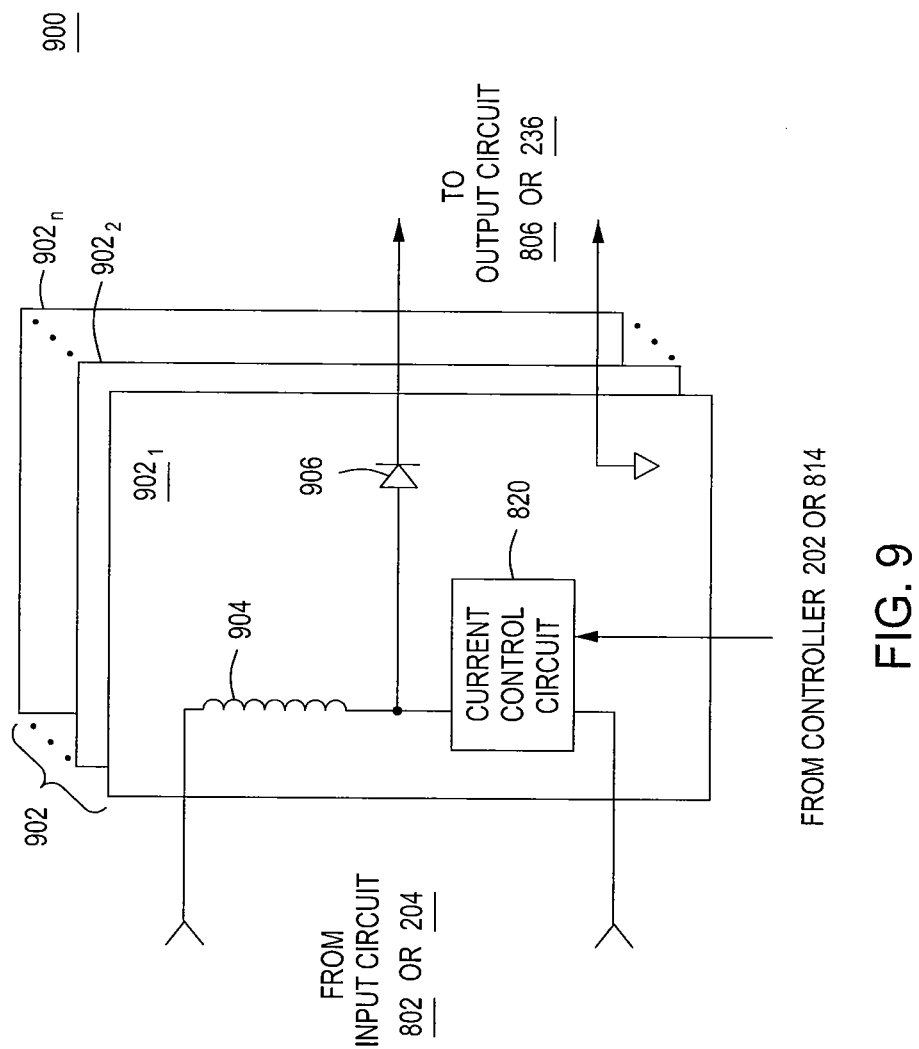
FIG. 9 is a detailed schematic of another alternative embodiment of a non-isolated power stage for providing AC to DC conversion or DC to AC conversion.

FIG. 9 is a detailed schematic of another alternative embodiment of a non-isolated power stage for providing AC to DC conversion or DC to AC conversion. In some embodiments, at least one power stage $902_1$, $902_2$ . . . $902_n$ (collectively referred to as power stages 902) is coupled to the input circuit 204, the controller 202, and the output circuit 236 for converting DC input power to AC output power. In other embodiments, the power stages 902 are coupled to the input circuit 802, the controller 814, and the output circuit 806 for converting AC input power to DC output power.

The power stages 902 are coupled to one another in parallel; the input circuit 204 or the input circuit 802 will utilize one or more of the power stages 902 depending on whether an interleaved flyback mode is utilized. Each power stage 902 comprises an inductor 904, a diode 906, and the current control circuit 820. A series combination of the inductor 904 and the current control circuit 820 is coupled across the input circuit 204 or the input circuit 802. An anode terminal of the diode 906 is coupled between the inductor 904 and the current control circuit 820, and a cathode terminal of the diode 906 is coupled to a first input terminal of the output circuit 236 or the output circuit 806. Additionally, a second input terminal of the output circuit 236 or the output circuit 806 is coupled to a ground terminal.

The current control circuit 820 is coupled to the controller 814 and controls the DC voltage that is applied to the inductor 904 in accordance with signals generated by the controller 814. Analogous to the power stages 225 and 804, each power stage 902 is independently utilized (i.e., selected) such that the power stages 902 can be interleaved and share the current load for the DC-AC inverter 102 or the AC-DC inverter 800; based upon current and/or voltage parameters, one or more power stages 902 may be selected for optimally converting the DC power to AC power or AC power to DC power. Selection of a power stage 902 is performed by activating the control circuit 820 of a particular power stage 902; power is then supplied to the corresponding inductor 904 based on the operation of the current control circuit 820. The resulting rectified sinewave output from the diode 906 is coupled to the output circuit 236 or the output circuit 806.

As previously described, to optimize efficiency of the power conversion, the controller 814 selects various flyback modes of operation (i.e., a regular flyback mode, an interleaved mode, a quasi-resonant mode, or combinations thereof). Selection of these modes actively occurs during each switching cycle to optimally convert the received input power to output power; in some embodiments, selection of the various modes occurs as previously described in the method 600 (i.e., with respect to the power stages 804).

In some embodiments, the current control circuit 820 may be the current control circuit 228 of FIG. 7. In such embodiments, the switch 718 switches the capacitor 716 across the main switch 710 as previously described for operating a power stage 902 in a quasi-resonant mode.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. Apparatus for converting a first power to a second power, comprising:
    a power conversion circuit for receiving the first power, wherein (i) the power conversion circuit comprises a plurality of power stages coupled to one another in parallel, (ii) each power stage of the plurality of power stages comprises a primary side for receiving an input power and a secondary side to provide an output power generated from the input power, and (iii) for each power stage of the plurality of power stages, power conversion by the power stage is controlled by switching only on the primary side; and
    a controller, coupled to the power conversion circuit, for dynamically selecting between a non-interleaved mode and an interleaved mode for operating the power conversion circuit to convert the first power to the second power, wherein only one power stage of the plurality of power stages is used during the non-interleaved mode, and at least two power stages of the plurality of power stages are used during the interleaved mode.

2. The apparatus of claim 1, wherein the first power is a DC power and the second power is an AC power.

3. The apparatus of claim 1, wherein the first power is an AC power and the second power is a DC power.

4. The apparatus of claim 1, wherein the controller dynamically selects between the non-interleaved mode and the interleaved mode based on a level of power.

5. The apparatus of claim 4, wherein the controller dynamically selects between the non-interleaved mode and the interleaved mode based further on an input voltage to the power conversion circuit and an output voltage from the power conversion circuit.

6. The apparatus of claim 5, wherein each power stage of the plurality of power stages is capable of converting a DC input power to a DC output power, and wherein the controller selects at least two power stages of the plurality of power stages for operating in the interleaved mode.

7. The apparatus of claim 6, wherein a number of power stages in the at least two power stages is proportional to the level of power.

8. The apparatus of claim 6, wherein each of the at least two power stages is operated with a delay.

9. The apparatus of claim 1, wherein the non-interleaved mode is a flyback mode and the interleaved mode is an interleaved flyback mode.

10. The apparatus of claim 1, wherein the non-interleaved mode is a quasi-resonant mode and the interleaved mode is an interleaved quasi-resonant mode.

11. A method for converting a first power to a second power, comprising:
    receiving the first power at a power conversion circuit, wherein (i) the power conversion circuit comprises a plurality of power stages coupled to one another in parallel, (ii) each power stage of the plurality of power stages comprises a primary side for receiving an input power and a secondary side to provide an output power generated from the input power, and (iii) for each power stage of the plurality of power stages, power conversion by the power stage is controlled by switching only on the primary side;
    dynamically selecting, by a controller coupled to the power conversion circuit, a mode for operating the power conversion circuit, wherein the mode is a non-interleaved mode or an interleaved mode, and wherein only one power stage of the plurality of power stages is used during the non-interleaved mode, and at least two power stages of the plurality of power stages are used during the interleaved mode; and converting, by the power conversion circuit, the first power to the second power utilizing the selected mode.

12. The method of claim 11, wherein the first power is a DC power and the second power is an AC power.

13. The method of claim 11, wherein the first power is an AC power and the second power is a DC power.

14. The method of claim 11, wherein selecting the mode is based on a level of power.

15. The method of claim 14, wherein selecting the mode is further based on an input voltage to the power conversion circuit and an output voltage from the power conversion circuit.

16. The method of claim 11, wherein selecting the mode comprises selecting two or more power stages of the plurality of power conversion stages for operating in the interleaved mode, and wherein each power stage of the two or more power stages is operated with a delay.

17. The method of claim 16, wherein selecting the two or more power stages comprises selecting a number of power stages in proportion to the level of power.

18. A system for converting a first power to a second power, comprising:

a power source for providing the first power;

a power conversion circuit coupled to the power source, wherein (i) the power conversion circuit comprises a plurality of power stages coupled to one another in parallel, (ii) each power stage of the plurality of power stages comprises a primary side for receiving an input power and a secondary side to provide an output power generated from the input power, and (iii) for each power stage of the plurality of power stages, power conversion by the power stage is controlled by switching only on the primary side; and a controller, coupled to the power conversion circuit, for selecting between a non-interleaved mode and an interleaved mode for operating the power conversion circuit to convert the first power to the second power, wherein only one power stage of the plurality of power stages is used during the non-interleaved mode, and at least two power stages of the plurality of power stages are used during the interleaved mode.

19. The system of claim 18, wherein the power source is a DC power source, the first power is a DC power, and the second power is an AC power.

20. The system of claim 18, wherein the power source is an AC power source, the first power is an AC power, and the second power is a DC power.

* * * * *